(12) United States Patent
Mizushima et al.

(10) Patent No.: US 8,432,515 B2
(45) Date of Patent: Apr. 30, 2013

(54) COMBINATION OPTICAL FILM, LAMINATED COMBINATION OPTICAL FILM AND IMAGE DISPLAY

(75) Inventors: Hiroaki Mizushima, Ibaraki (JP); Satoru Yamamoto, Ibaraki (JP); Yoshimi Oota, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1101 days.

(21) Appl. No.: 11/667,337

(22) PCT Filed: Nov. 9, 2005

(86) PCT No.: PCT/JP2005/020536
§ 371 (c)(1),
(2), (4) Date: May 9, 2007

(87) PCT Pub. No.: WO2006/051815
PCT Pub. Date: May 18, 2006

(65) Prior Publication Data
US 2007/0296890 A1    Dec. 27, 2007

(30) Foreign Application Priority Data

Nov. 11, 2004   (JP) .................................. 2004-327476

(51) Int. Cl.
   *G02F 1/1335*   (2006.01)
(52) U.S. Cl.
   USPC .............................. 349/117; 349/96; 349/119
(58) Field of Classification Search .............. 349/96–98, 349/117–121; 359/497, 486.01–486.03
   See application file for complete search history.

(56) References Cited

U.S. PATENT DOCUMENTS

| 5,935,377 | A | 8/1999  | Sergel et al.   |
| 6,104,457 | A | 8/2000  | Izumi et al.    |
| 6,111,670 | A | 8/2000  | Hattori et al.  |
| 6,144,425 | A | 11/2000 | Kawabata et al. |
| 6,154,316 | A | 11/2000 | Fukui et al.    |

(Continued)

FOREIGN PATENT DOCUMENTS

| CN | 1177119 A   | 3/1998 |
| DE | 3933710 A1  | 4/1990 |

(Continued)

OTHER PUBLICATIONS

Chinese Office Action dated Oct. 23, 2009, issued in corresponding Chinese Patent Application No. 200580036761.1.

(Continued)

*Primary Examiner* — Bumsuk Won
*Assistant Examiner* — Charles Chang
(74) *Attorney, Agent, or Firm* — Westerman, Hattori, Daniels & Adrian, LLP

(57) ABSTRACT

The combination optical film of the invention comprises a plurality of optical films in which at least one end face of the optical films are butted against one another, wherein the butted end faces substantially match one another in shape, the butted end faces each have a portion non-vertical to the front and back surfaces of the optical films, and the end faces are butted against one another so as not to form a continuous gap in the normal direction of the optical films from the front to back surfaces. The combination optical film can prevent light leakage without degrading appearance.

13 Claims, 7 Drawing Sheets

U.S. PATENT DOCUMENTS

| | | | |
|---|---|---|---|
| 6,262,787 | B1 | 7/2001 | Kamoi et al. |
| 2003/0001988 | A1* | 1/2003 | Maeda et al. .................. 349/96 |
| 2004/0145087 | A1 | 7/2004 | Cerny et al. |
| 2004/0145807 | A1* | 7/2004 | Stark ............................ 359/495 |
| 2005/0018303 | A1 | 1/2005 | Harada |

FOREIGN PATENT DOCUMENTS

| | | |
|---|---|---|
| DE | 4231457 C1 | 1/1994 |
| EP | 0 849 649 A2 | 6/1998 |
| JP | 02-186145 A | 7/1990 |
| JP | 05-088163 A | 4/1993 |
| JP | 06-281818 A | 10/1994 |
| JP | 6-342187 A | 12/1994 |
| JP | 07-261272 A | 10/1995 |
| JP | 7-270916 A | 10/1995 |
| JP | 8-169062 A | 7/1996 |
| JP | 09-076342 A | 3/1997 |
| JP | 09-113712 A | 5/1997 |
| JP | 9-316759 A | 12/1997 |
| JP | 10-175256 A | 6/1998 |
| JP | 11-102153 A | 4/1999 |
| JP | 11-109300 A | 4/1999 |
| JP | 2001-018293 A | 1/2001 |
| JP | 2001-121619 A | 5/2001 |
| JP | 2001-174921 A | 6/2001 |
| JP | 2001-290384 A | 10/2001 |
| JP | 2001-322104 A | 11/2001 |
| JP | 2002-055634 A | 2/2002 |
| JP | 2002-060504 A | 2/2002 |
| JP | 2003-233318 A | 8/2003 |
| JP | 2003-337556 A | 11/2003 |
| JP | 2004-93825 A | 3/2004 |
| JP | 2004-145305 A | 5/2004 |
| JP | 2004-252263 A | 9/2004 |
| JP | 2004-253335 A | 9/2004 |
| JP | 2005-234088 A | 9/2005 |
| JP | 2005-283749 A | 10/2005 |
| JP | 4317006 B2 | 8/2009 |
| KR | 1999-006450 A | 1/1999 |
| TW | 557367 B | 10/2003 |
| TW | 200301369 A | 7/2004 |

OTHER PUBLICATIONS

Japanese Office Action dated Jun. 9, 2010, issued in corresponding Japanese Patent Application No. 2005-324382.
International Preliminary Report on Patentability for PCT/JP2005/020536 mailed May 24, 2007.
Korean Office Action dated May 30, 2008, issued in corresponding Korean Patent Application No. 10-2007-7005901.
Supplementary European Search Report dated Aug. 11, 2010, issued in corresponding European Patent Application No. 05806044.
International Search Report of PCT/JP2005/020536, date of mailing Jan. 31, 2006.
Chinese Office Action dated Jul. 10, 2009, issued in corresponding Chinese Patent Application No. 200580036761.1.
Chinese Office Action dated Nov. 10, 2010, issued in corresponding Chinese Patent Application No. 200810170166.2.
Chinese Office Action dated Jan. 12, 2011, issued in corresponding Chinese Patent Application No. 200810170167.7 with partial English translation.
Chinese Office Action dated Jan. 31, 2012, issued in corresponding Chinese Patent Application No. 200810170167.7.
Chinese Office Action dated May 12, 2011, issued in corresponding Chinese Patent Application No. 2008101701681 with an English translation.
Japanese Office Action dated Sep. 4, 2012 (dispatch date), issued in corresponding Japanese Patent Application No. 2010-173829 (7 pages) with an English translation.
Taiwanese Office Action dated Nov. 11, 2012, issued in corresponding Taiwanese Patent Application No. 094139625, (9 pages). With English Translation.
Taiwanese Office Action dated Jul. 31, 2012, issued in corresponding Taiwanese Patent Application No. 094139625, (5 pages). With English Translation.

* cited by examiner

······(1)

······(2)

······(3),(4)

······(5)

······(5)

------ (11)

------ (12)

COMBINATION OPTICAL FILM, LAMINATED COMBINATION OPTICAL FILM AND IMAGE DISPLAY

TECHNICAL FIELD

The invention relates to a combination optical film including a plurality of optical films whose end faces are butted against one another. The invention also relates to a laminated combination optical film including a laminate of the combination optical films. The invention also relates to an image display such as a liquid crystal display, an organic electroluminescence display and a plasma display panel, using the combination optical film or the laminated combination optical film.

Examples of the optical film include a polarizer, a protective film to be laminated on one or both sides of a polarizer, a polarizing plate including a polarizer and the protective film laminated on one or both sides of the polarizer, a retardation plate, an optical compensation film, and a brightness enhancement film. Any one of these optical films may be used alone for the combination optical film, or a laminate of any of these optical films may be used for the combination optical film. Such a laminate may also include a combination optical film. Any of the optical films may be used to form combination optical films, which may be used in the form of a laminate.

BACKGROUND ART

Image displays such as liquid crystal displays for use in televisions, personal computers and the like use optical films such as polarizing plates. As the size of televisions and the like has grown in recent years, large-area optical films have been demanded. For the manufacture of large-area optical films, corresponding large manufacturing facilities are necessary, and a difficulty in handling for packing is associated with transportation, which requires high cost. In order to install such large manufacturing facilities, a large place is required. Thus, there has been proposed a technique in which a plurality of liquid crystal displays are arranged with their end faces butted against one another to form a large-sized liquid crystal display.

Liquid crystal displays of televisions, personal computers and the like produce a display by transmitting and blocking (absorbing) light from their back side based on the function of optical films such as polarizing plates. Thus, butting of the end faces of liquid crystal displays has a problem in which the butted portion can cause light leakage to produce a light line on the front face of liquid crystal displays. Against this problem, there is disclosed a technique in which as shown in FIG. 21, a film F is attached onto polarizing plates (optical films A) at the butted portion of liquid crystal displays (on the portion between the butted end faces x) to prevent light leakage (see Patent Literature 1 below). However, the technique of Patent Literature 1 has a problem in which the film attached to the surface of the polarizing plates can degrade the surface appearance of liquid crystal displays, although light leakage can be prevented.

Patent Literature 1: Japanese Patent Application Laid-Open (JP-A) No. 05-88163

DISCLOSURE OF THE INVENTION

Problems to be Solved by the Invention

It is an object of the invention to provide a combination optical film that includes a plurality of optical films whose end faces are butted against one another and that can prevent light leakage without degrading appearance.

It is another object of the invention to provide an image display using such a combination optical film.

Means for Solving the Problems

As a result of active investigations for solving the above problems, the inventors have found that the objects can be achieved with the combination optical film and the like described below, so that the invention has been completed.

The present invention relates to a combination optical film (1), comprising:
a plurality of optical films in which at least one end face of the optical films are butted against one another, wherein
the butted end faces substantially match one another in shape,
the butted end faces each have a portion non-vertical to the front and back surfaces of the optical films, and
the end faces are butted against one another so as not to form a continuous gap in the normal direction of the optical films from the front to back surfaces.

In the combination optical film (1), the butted end faces substantially match one another in shape and have a portion non-vertical to the front and back surfaces of the optical film, and the end faces are butted against one another so as not to form a continuous gap in the normal direction of the optical film from the front to back surfaces. The shapes of the butted end faces preferably match one another. Such a configuration can prevent light leakage from the butted portion without forming a gap in the vertical direction from the front to back surfaces at the butted portion. When the shape of the butted end faces is designed in such a manner, light leakage can be prevented without attaching a film. Thus, if the combination optical film is used for liquid crystal displays and the like, leakage of the light emitted from the back side can be prevented without degrading the surface appearance.

In the combination optical film (1), an optical film in which the butted end faces are planes inclined with respect to the front and back surfaces of the optical films may be used.

While the end faces to be butted may have various shapes, inclined plane-shaped end faces are easily formed to be butted and facilitate the operation for combining the end faces to be butted in the manufacture of the combination optical film.

In the combination optical film (1), the butted end faces preferably make an angle θ of inclination of 1° to 89° with the normal line of the optical films. The angle θ of inclination of the butted end faces is preferably, but not limited to, in the above range, in view of the ability to prevent light leakage and easiness of working, the operation for combination or the like. It is more preferably from 5 to 75°, still more preferably from 10 to 65°.

It is preferable the relations $t \leq d \times \tan \theta$ and $1° \leq \theta \leq 60°$ are satisfied, wherein θ represents the angle of inclination of the butted end faces, t (μm) represents an average distance between the films in the butted portion, and d (μm) represents the thickness of the optical films.

The angle θ of inclination may be designed as needed, because it depends on the type, thickness d and optical properties of the optical film or the circumstances where the optical film is used. For example, when the combination optical film according to the invention is used for a liquid crystal display and placed on the viewer side with respect to a liquid crystal cell, light leakage tends to occur in the normal direction of view, and thus the relation $t \leq d \times \tan \theta$ should preferably be satisfied, wherein t is an average gap value in the butted portion of the combination optical film.

Generally, in image display applications such as TV applications, light leakage less occurs in a relatively wide range of viewing angle, and therefore the angle θ of inclination is preferably as large as possible. From this point of view, the angle θ of inclination is preferably 45° or more, more preferably 60° or more, still more preferably 75° or more. For liquid crystal display applications in which the desired viewing angle is not so wide, such as notebook PC applications, the angle θ of inclination may be about 30° or more, preferably 45° or more. On the other hand, considering easiness of working in the process of butting optical films, relatively small angles of inclination are preferred. If the angle θ of inclination is too large, the butted portions can tend to overlap too much or form a step in the butting process so that it can be difficult to keep the size of the resulting combination optical film constant. From this point of view, the angle θ of inclination is preferably 1° or more, more preferably 5° or more, still more preferably 10° or more, yet more preferably 15° or more. From both points of view, the angle θ of inclination preferably satisfies the relation $1°≦θ≦60°$, more preferably the relation $10°≦θ≦60°$, still more preferably the relation $15°≦θ≦60°$.

The present invention also relates to a combination optical film (2), comprising:

a plurality of optical films in which at least one end face of the optical films are butted against one another, wherein the butted end faces are bonded to one another with a bonding agent having substantially the same refractive index as the optical films.

In the combination optical film (2), the butted end faces are bonded to one another with a bonding agent having substantially the same refractive index as the optical film, and the gap of the butted portion is covered with a bonding agent, so that the gap-induced degradation of appearance can be reduced. In addition, since the refractive index of the bonding agent is substantially the same as that of the optical film, the visibility is not inhibited. Thus, if the combination optical film is used for liquid crystal displays and the like, leakage of the light emitted from the back side can be prevented without degrading the surface appearance.

The present invention also relates to a combination optical film (3), comprising:

a plurality of optical films in which at least one end face of the optical films are butted against one another, wherein the butted end faces are bonded to one another by dissolution with an organic solvent capable of dissolving the optical films and by solidification.

In the combination optical film (3), the butted end faces are bonded by dissolution with an organic solvent capable of dissolving the optical film and by solidification. Thus, the butted portions are dissolved and bonded to one another without forming a gap so that the gap-induced degradation of appearance can be avoided. In addition, since the optical films are bonded through dissolution, the visibility is not inhibited. Thus, if the combination optical film is used for liquid crystal displays and the like, leakage of the light emitted from the back side can be prevented without degrading the surface appearance.

The present invention also relates to a combination optical film (4), comprising:

a plurality of optical films in which at least one end face of the optical films are butted against one another, wherein the butted end faces are bonded to one another by heat fusion.

In the combination optical film (4), the butted end faces are bonded by heat fusion of the optical films. Thus, the butted portions are fusion-bonded to one another without forming a gap so that the gap-induced degradation of appearance can be avoided. In addition, since the optical films are bonded by fusion, the visibility is not inhibited. Thus, if the combination optical film is used for liquid crystal displays and the like, leakage of the light emitted from the back side can be prevented without degrading the surface appearance.

The present invention also relates to a combination optical film (5), comprising:

a plurality of optical films in which at least one end face of the optical films are butted against one another, wherein the pluralities of optical films have a diffusion layer and/or an optical film at their front surface and/or back surface.

The present invention also relates to a combination optical film (6), comprising:

a plurality of optical films in which at least one end face of the optical films are butted against one another, wherein a diffusion layer and/or an optical film is provided on the front surface and/or back surface of the combination optical film.

When a diffusion layer is stacked as in the combination optical film (5) or (6), light can be diffused by the diffusion layer so that the joint between the butted end faces can be made less noticeable, and the visibility can be improved. A brightness enhancement film may be stacked as an optical film in place of or together with the diffusion layer. In such a case, for example, if the brightness enhancement film (a linearly polarized light separating film) in the combination polarizing plate is placed between a polarizing plate and a backlight, the joint between the butted end faces can be made less noticeable. In the combination optical film (5) or (6), the butted end faces may have the same structure as that in the combination optical film (1), (2), (3), or (4), so that the visibility can be improved.

In the combination optical film (1), (2), (3), (4), (5), or (6), the optical films preferably have a thickness of 500 μm or less, more preferably of 300 μm or less. If the thickness of the optical films is more than 500 μm, the films can be highly elastic so that a problem such as a difficulty in attachment to a liquid crystal panel can tend to occur.

In the combination optical film (1), (2), (3), (4), (5), or (6), for example, a polarizer, a protective film for a polarizer, or a polarizing plate including a polarizer and a protective film formed on one or both sides of the polarizer is preferably used, while various types of optical films may be used in it. Specifically, any one of a polarizer and a protective film for a polarizer may be used alone as the optical film, and a polarizing plate including a polarizer and a protective film laminated on one or both sides of the polarizer may also be used as the optical film.

If the polarizing plates are used as the optical films described above, when a liquid crystal panel is formed which comprises: a liquid crystal cell; the combination polarizing plate placed on the backlight side of the liquid crystal cell; and a polarizing plate (uncombined) placed on the viewer side of the liquid crystal cell in the cross Nicol configuration, the difference between a central brightness A ($cd/cm^2$) of the butted portion of the combination polarizing plate measured in the liquid crystal panel and a brightness B ($cd/cm^2$) of a peripheral portion measured in the liquid crystal panel, which is the difference between the central brightness A and the peripheral brightness B, is preferably 20 $cd/cm^2$ or less. The difference is more preferably 15 $cd/cm^2$ or less, still more preferably 10 $cd/cm^2$ or less, yet more preferably 5 $cd/cm^2$ or less. The smaller the difference, the less the light leakage will be.

In the combination optical film (1), (2), (3), (4), (5), or (6), a retardation plate may also be provided as the optical film.

If the retardation plates are used as the optical films described above, when a liquid crystal panel is formed which comprises: a liquid crystal cell; the combination retardation plate placed adjacent to the liquid crystal cell on the backlight side; and polarizing plates (uncombined) placed in the cross Nicol configuration on both sides of the laminate of the liquid crystal cell and the combination retardation plate, wherein an absorption axis of the polarizing plate on the backlight side is placed substantially parallel to a slow axis of the combination retardation plate, the difference between a central brightness A ($cd/cm^2$) of the butted portion of the combination retardation plate measured in the liquid crystal panel and a brightness B ($cd/cm^2$) of a peripheral portion measured in the liquid crystal panel, which is the difference between the central brightness A and the peripheral brightness B, is preferably 20 $cd/cm^2$ or less. The difference is more preferably 15 $cd/cm^2$ or less, still more preferably 10 $cd/cm^2$ or less, yet more preferably 5 $cd/cm^2$ or less. The smaller the difference, the less the light leakage will be.

In the combination optical film (1), (2), (3), (4), (5), or (6), easily peelable protective films may be attached to the front surface and/or back surface of the plurality of optical films, and an adhesive tape may be attached onto the adjacent protective films correspond to the butted portion of the combination optical film to join them to one another.

When easily peelable protective films are attached to the front or back surface of the plurality of optical films, an adhesive tape may be attached to the protective films to join them, so that the adjacent protective films can be peeled at a time, and thus a potentially complicated peeling process can be simplified.

The present invention also relates to a laminated combination optical film (11), comprising a laminate of at least two layers of the combination optical films (1), (2), (3), (4), (5) and (6).

The combination optical film (1), (2), (3), (4), (5), or (6) may be used to form a laminate, respectively, and the resulting laminated combination optical film (11) produces the same effect as the combination optical film (1), (2), (3), (4), (5), or (6).

The present invention also relates to a laminated combination optical film (12), comprising:

a laminate of a plurality of combination optical films in which at least one end face of the optical films are butted against one another, wherein the combination optical films are laminated in such a manner that at least a pair of the butted portions of the combination optical films do not coincide with one another in the normal direction of the combination optical films.

In the laminated combination optical film (12), the combination optical films are laminated in such a manner that the respective butted portions do not coincide with one another, so that even if the butted portion in each layer has a gap, the gap can be masked with any other layer in the whole of the laminated combination optical film (12). As a result, no gap appears in the vertical direction from the front to back surfaces of the laminated combination optical film (12) so that light leakage from the butted portions can be prevented. Thus, if the laminated combination optical film (12) is used for liquid crystal displays and the like, leakage of the light emitted from the back side can be prevented without degrading the surface appearance.

In the laminated combination optical film (12), at least one layer of the combination optical film may have the same structure as that of the combination optical film (1), (2), (3), or (4). Such a structure can more effectively prevent light leakage without degrading appearance.

In the laminated combination optical film (11) or (12), the plurality of optical films that form the front combination optical film and/or the back combination optical film may have a diffusion layer and/or an optical film at any one of their front face, back face and interface.

In the laminated combination optical film (11) or (12), the laminated combination optical film may have a diffusion layer and/or an optical film provided on any one of the front face, back face and interface of the laminated combination optical film.

When a diffusion layer is stacked on the laminated combination optical film (11) or (12), not only the above effect can be produced, but also light can be diffused by the diffusion layer so that the joint between the butted end faces can be made less noticeable, and the visibility can be improved. A brightness enhancement film may be stacked as an optical film in place of or together with the diffusion layer. In such a case, for example, if the brightness enhancement film (a linearly polarized light separating film) in the combination polarizing plate is placed between a polarizing plate and a backlight, the joint between the butted end faces can be made less noticeable.

In the laminated combination optical film (11) or (12), the optical films in each layer preferably have a thickness of 500 μm or less, more preferably of 300 μm or less. If the thickness of the optical films is more than 500 μm, the films can be highly elastic so that a problem such as a difficulty in attachment to a liquid crystal panel can tend to occur.

In the laminated combination optical film (11) or (12), various types of optical films may be used. For example, a polarizer may be used as the optical film of the combination optical film in one layer, and a protective film for the polarizer may be used as the optical film of the combination optical film in at least one of the other layers, so that the laminated combination optical film (11) or (12) can be formed as a polarizing plate.

In the laminated combination optical film (11) or (12), polarizing plates may be selected and used as all of the optical films for the combination optical films in the respective layers.

If the polarizing plates are used as the combination optical films in all layers described above, when a liquid crystal panel is formed which comprises: a liquid crystal cell; the laminated combination polarizing plate placed on the backlight side of the liquid crystal cell; and a polarizing plate (uncombined) placed on the viewer side of the liquid crystal cell in the cross Nicol configuration, the difference between a central brightness A ($cd/cm^2$) of the butted portion of the laminated combination polarizing plate measured in the liquid crystal panel and a brightness B ($cd/cm^2$) of a peripheral portion measured in the liquid crystal panel, which is the difference between the central brightness A and the peripheral brightness B, is preferably 20 $cd/cm^2$ or less. The difference is more preferably 15 $cd/cm^2$ or less, still more preferably 10 $cd/cm^2$ or less, yet more preferably 5 $cd/cm^2$ or less. The smaller the difference, the less the light leakage will be.

In the laminated combination optical film (11) or (12), retardation plates may be selected and used as all of the optical films for the combination optical films in the respective layers.

If the retardation plates are used as the combination optical films in all layers described above, a liquid crystal panel is formed which comprises:

a liquid crystal cell; the laminated combination retardation plate placed adjacent to the liquid crystal cell on the backlight side; and polarizing plates (uncombined) placed in the cross Nicol configuration on both sides of the laminate of the liquid crystal cell and the laminated combination retardation plate, wherein an absorption axis of the polarizing plate on the backlight side is placed substantially parallel to a slow axis of the laminated combination retardation plate, the difference between a central brightness A ($cd/cm^2$) of the butted portion of the laminated combination retardation plate measured in the liquid crystal panel and a brightness B ($cd/cm^2$) of a peripheral portion measured in the liquid crystal panel, which is the difference between the central brightness A and the peripheral brightness B, is preferably 20 $cd/cm^2$ or less. The difference is more preferably 15 $cd/cm^2$ or less, still more preferably 10 $cd/cm^2$ or less, yet more preferably 5 $cd/cm^2$ or less. The smaller the difference, the less the light leakage will be.

In the laminated combination optical film (11) or (12), easily peelable protective films may be attached to the plurality of optical films that form the front combination optical film and/or the back combination optical film, and an adhesive tape may be attached onto the adjacent protective films correspond to the butted portion of the combination optical film to join them to one another.

When easily peelable protective films are attached to the front or back surface of the plurality of optical films, an adhesive tape may be attached to the protective films to join them, so that the adjacent protective films can be peeled at a time, and thus a potentially complicated peeling process can be simplified.

The present invention also relates to an image display, comprising the above combination optical film or the above laminated combination optical film.

In the combination optical film (1), (2), (3), (4), (5), or (6) or the laminated combination optical film (11) or (12), light leakage can be prevented without attaching a film to the gap of the butted portion, and if these are used for liquid crystal displays and the like, leakage of the light emitted from the back side can be prevented without degrading the surface appearance.

The combination optical film is prepared using a plurality of optical films and thus can be prepared in any desired size using conventional optical films. Thus, the combination optical film may be preferably used to form large-sized optical films. For the combination optical film, each optical film can be separately transferred so that transportation can be easily performed. The butt technique also allows the recycling of residual parts (optical films) which have ever been discarded as being odd-sized.

BRIEF DESCRIPTION OF DRAWINGS

FIG. 12 (B) is a diagram showing an exemplary cross-sectional part of a complex of the combination optical films (1) and (5) of the invention;

FIG. 13 (B) is a diagram showing an exemplary cross-sectional part of a complex of the combination optical films (1) and (6) of the invention;

FIG. 13 (C) is a diagram showing an exemplary cross-sectional part of a complex of the combination optical films (1) and (6) of the invention;

FIG. 19 (B) is a diagram showing an exemplary cross-sectional part of the laminated combination optical film (12) of the invention using the combination optical film (6);

DESCRIPTION OF REFERENCE MARKS

Figure 1:
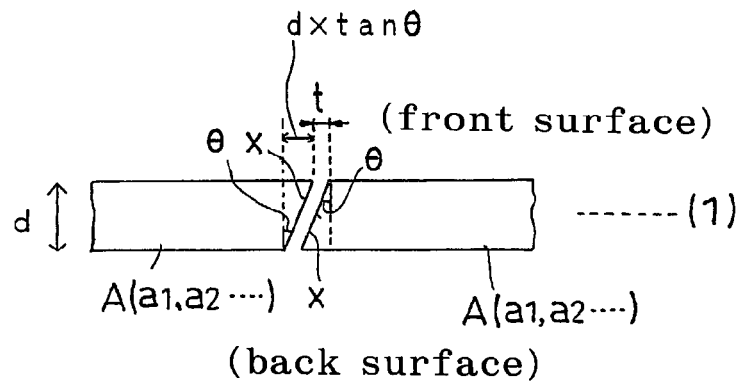
FIG. 1 is a diagram showing an exemplary cross-sectional part of the combination optical film (1) of the invention.

In the drawings, reference mark A represents an optical film, A' another optical film, x a butted end face, D a diffusion layer, L1 an easily peelable protective film, L2 another easily peelable protective film (separator), P a pressure-sensitive adhesive layer, T an adhesive tape, and F a film.

BEST MODE FOR CARRYING OUT THE INVENTION

The combination optical films (1), (2), (3), (4), (5), and (6) and the laminated combination optical films (11) and (12) according to the invention are described below with reference to the drawings.

FIGS. 1 to 9 each illustrates the combination optical film (1) that includes a plurality of optical films each having at least one end face, wherein the end faces are butted against one another, the butted end faces substantially match one another in shape, and the butted end faces each have at least a portion non-vertical to the front and back surfaces of the optical films. The end faces are butted against one another so as not to form a continuous gap in the normal direction of the optical films from the front to back surfaces. FIGS. 1 to 9 each show an example where two optical films A are combined. The front and back surfaces of the optical film are interchangeable, and any side may be the front or back surface.

Figure 2:
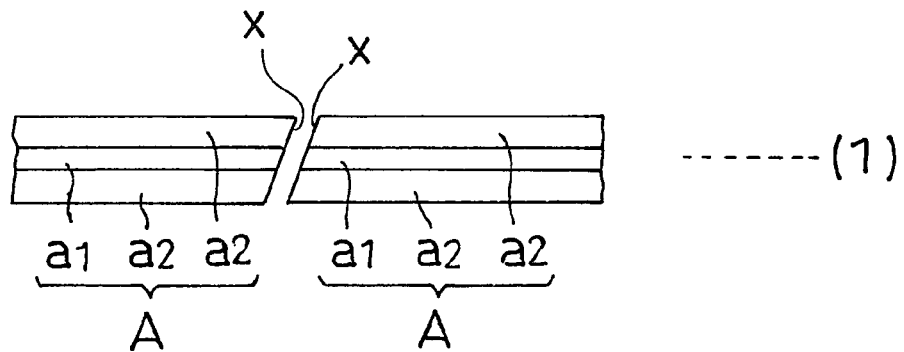
FIG. 2 is a diagram showing an exemplary cross-sectional part of the combination optical film (1) of the invention.
Figure 3:
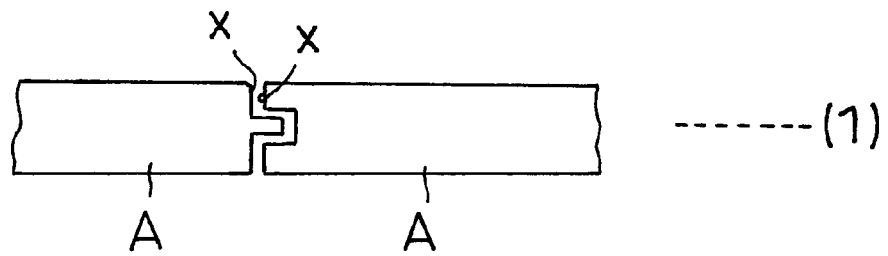
FIG. 3 is a diagram showing an exemplary cross-sectional part of the combination optical film (1) of the invention.
Figure 4:
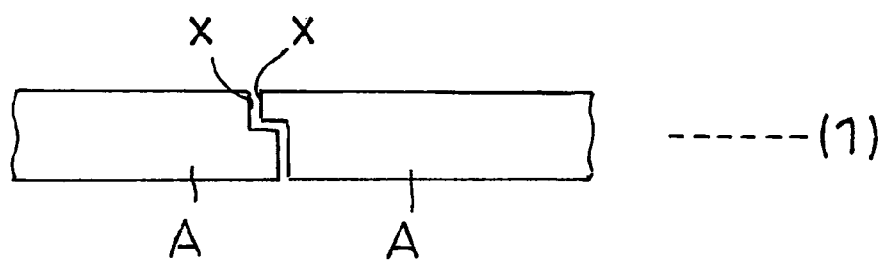
FIG. 4 is a diagram showing an exemplary cross-sectional part of the combination optical film (1) of the invention.
Figure 5:
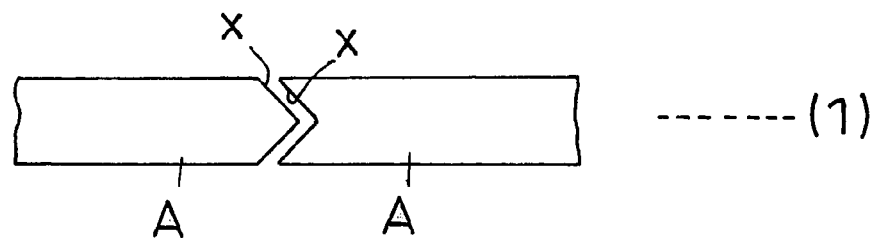
FIG. 5 is a diagram showing an exemplary cross-sectional part of the combination optical film (1) of the invention.
Figure 6:
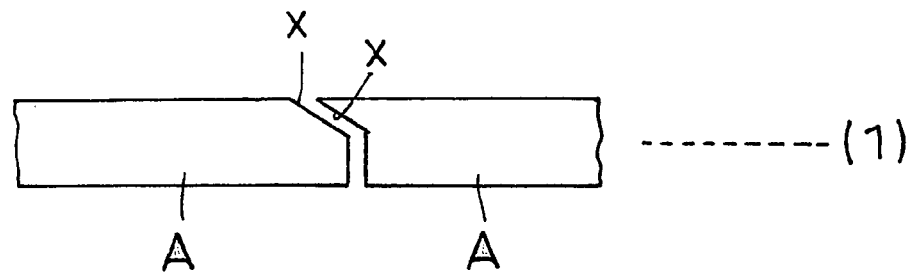
FIG. 6 is a diagram showing an exemplary cross-sectional part of the combination optical film (1) of the invention.
Figure 7:
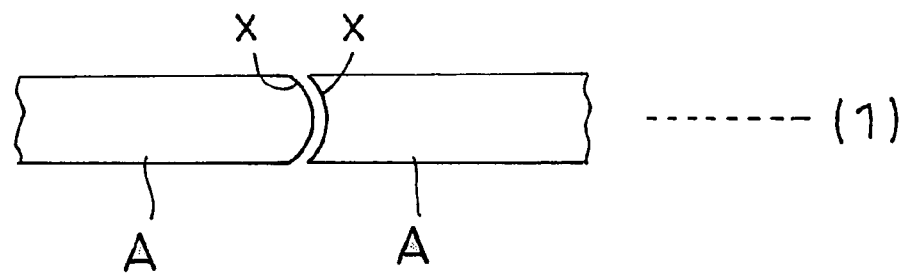
FIG. 7 is a diagram showing an exemplary cross-sectional part of the combination optical film (1) of the invention.
Figure 8:
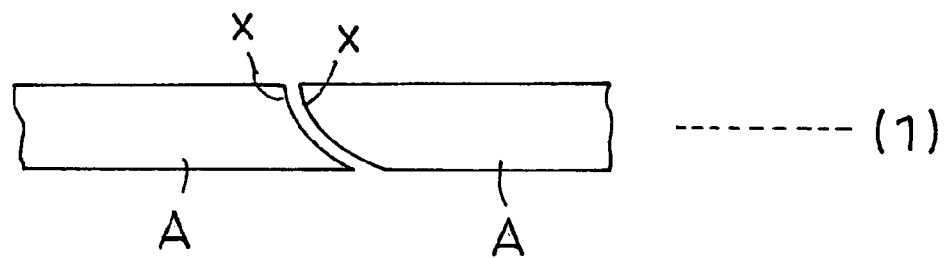
FIG. 8 is a diagram showing an exemplary cross-sectional part of the combination optical film (1) of the invention.
Figure 9:
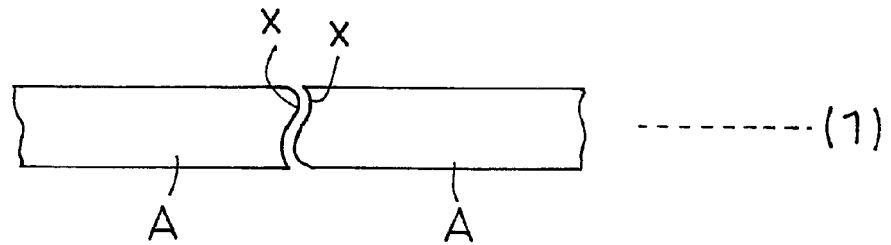
FIG. 9 is a diagram showing an exemplary cross-sectional part of the combination optical film (1) of the invention.

In the combination optical film (1), the butted end faces x match each other in shape. The butted end faces x may be in any form, as long as they have a portion non-vertical to the front and back surfaces of the optical films A. For example, the butted end surfaces x may be shaped as shown in each of FIGS. 1 to 9. FIGS. 1 and 2 each show a case where the butted end faces x are in the form of planes inclined between the front and back surfaces of the optical films A. FIG. 3 shows a case where concave and convex end faces are combined. FIG. 4 shows a case where key-shaped end faces are combined. FIG. 5 shows a case where V-shaped end faces are combined. FIG. 6 shows a case where each end face is partially a plane inclined between the front and back surfaces of the optical films A and partially vertical to the front and back surfaces. FIG. 7 shows a case where semicircle-shaped end faces are combined. FIG. 8 shows a case where inclined circular arc end faces are combined. FIG. 9 shows a case where corrugated end faces are combined.

Among the forms of the combination optical film (1) illustrated above, the butted end faces x are preferably in the form of planes inclined between the front and back surfaces of the optical films A as shown in FIG. 1 or 2. Concerning the butted end faces x in the form of inclined planes, the angle θ of inclination between the end face x and the normal direction of the optical film A may be designed as needed, because it depends on the type or thickness of the optical film. It is preferred that the relation $t \leqq d \times \tan \theta$ should be satisfied, wherein θ (°) is the angle of inclination of the butted end face as stated above, t (μm) is an average distance between the films in the butted portion, and d (μm) is the thickness of the optical film.

For example, in a case where the optical films are polarizers and the accuracy of butt gap is 5 μm, the angle θ of inclination is preferably 30° or more for a polarizer thickness of 10 μm, preferably 15° or more for a polarizer thickness of 20 μm, preferably 10° or more for a polarizer thickness of 30 μm, preferably 6° or more for a polarizer thickness of 50 μm. In general, the distance t between the butted end faces is preferably 20 μm or less such that no continuous gap is provided in the normal direction of the optical film from the front to back surfaces, and no gap should be desired. In order to eliminate the gap, the butted end faces x are preferably worked or formed with high accuracy by cutting, grinding, or any other method.

In general, the same optical films A are used to be combined. In each drawing, a pair of optical films A shown left and right are preferably the same.

The optical film A may be of various types. FIG. 1 shows a case where a single layer of the optical film A is used. The optical film A may be a single layer or a laminate of two or more layers. FIG. 2 shows that an optical films a2 is laminated on both sides of an optical film a1 to form the optical film A. In FIG. 2, for example, a1 may represent a polarizer, and a2 may represent a protective film for the polarizer, so that the optical film A may be a polarizing plate comprising the polarizer and a protective film laminated on both sides thereof. The laminate as shown in FIG. 2 may use an adhesive or a pressure-sensitive adhesive, which is omitted in FIG. 2. Examples of the optical film include not only those illustrated above but also retardation plates, optical compensation films, brightness enhancement films, and the like. With respect to these aspects, the same may apply to the optical film A shown in any other drawing.

Figure 10:
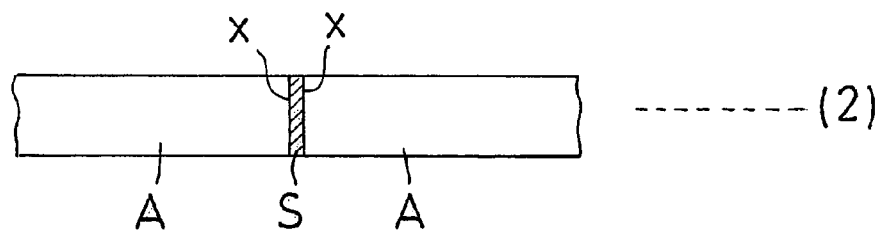
FIG. 10 is a diagram showing an exemplary cross-sectional part of the combination optical film (2) of the invention.

FIG. 10 illustrates the combination optical film (2) that includes a plurality of optical films each having at least one end face, wherein the end faces are butted against one another and bonded to one another with a bonding agent having substantially the same refractive index as the optical films. FIG. 10 shows an example where two optical films A are combined.

In FIG. 10, the butted end faces x are bonded to each other with a bonding agent S having substantially the same refractive index as the optical films A. The bonding agent may be a generally known adhesive or pressure-sensitive adhesive. In this case, a pressure-sensitive adhesive is preferably used, because it can be peeled again and allows easy recombination. The difference in refractive index between the optical film A and the bonding agent S is preferably 0.03 or less, more preferably 0.02 or less. The refractive index may be a value measured with an Abbe refractometer at a wavelength of 589.3 nm.

Figure 11:
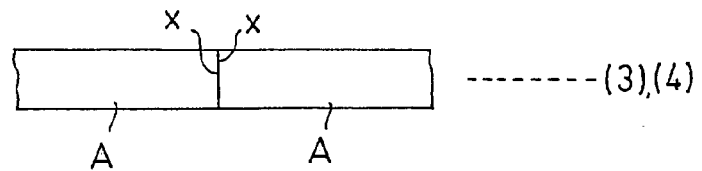
FIG. 11 is a diagram showing an exemplary cross-sectional part of the combination optical film (2) or (3) of the invention.

FIG. 11 illustrates the combination optical film (3) that includes a plurality of optical films each having at least one end face, wherein the end faces are butted against one another, and the butted end faces are bonded to one another by dissolution with an organic solvent capable of dissolving the optical films and by solidification. FIG. 11 also illustrates the combination optical film (4) that includes a plurality of optical films each having at least one end face, wherein the end faces are butted against one another, and the butted end faces are bonded to one another by heat fusion. FIG. 11 shows an example where two optical films A are combined.

In FIG. 11, the butted end faces x are bonded and integrated by dissolution and solidification or by fusion.

In FIG. 10 or 11, the butted end faces x may be changed to those shown in each of FIGS. 1 to 9.

Figure 12A:
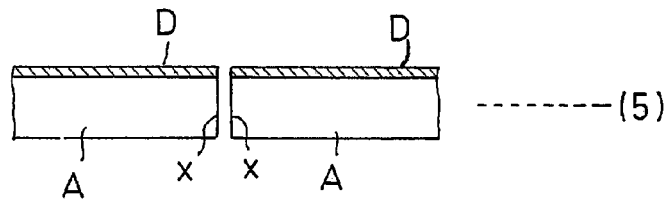
FIG. 12 (A) is a diagram showing an exemplary cross-sectional part of the combination optical film (5) of the invention.
Figure 12B:
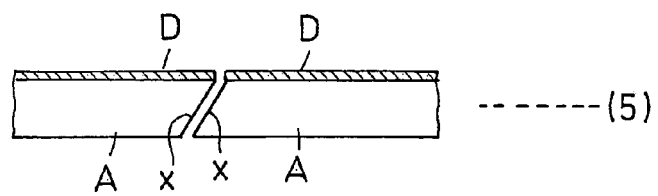
Figure 13A:
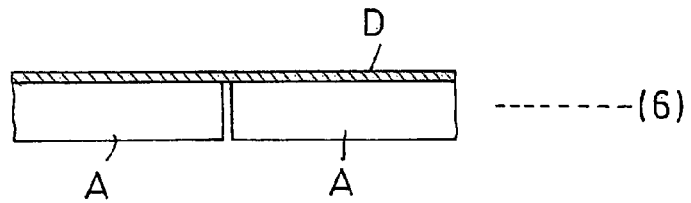
FIG. 13 (A) is a diagram showing an exemplary cross-sectional part of the combination optical film (6) of the invention.
Figure 13B:
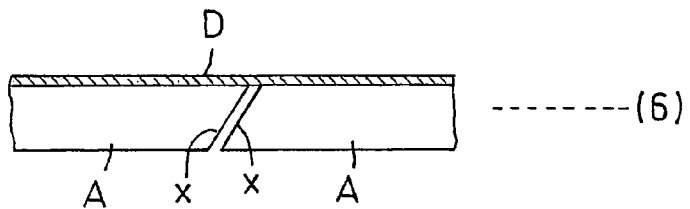
Figure 13C:
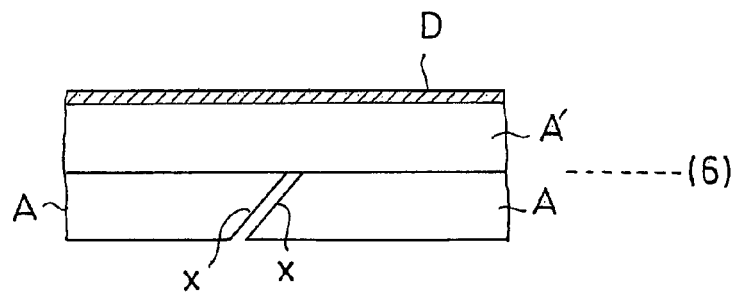

FIG. 12(A) illustrates the combination optical film (5) that includes a plurality of optical films each having a diffusion layer at its surface. FIG. 13(A) illustrates the combination optical film (6) having a diffusion layer at its surface. While the butted end faces x are vertical to the optical films A in FIG. 12(A) or 13(A), the structure of the butted end faces x may be changed to that of the combination optical film (1), (2), (3), or (4). FIGS. 12(B) and 13(B) each illustrate a case where a diffusion layer D is formed on the front surface of the combination optical film (1) shown in FIG. 1. Alternatively, the diffusion layer may be formed on the back surface or both surfaces. Alternatively, another optical film A' may be used in place of or together with the diffusion layer D. The plurality of optical films A may each include the optical film A', or the optical film A' may be a single film that is formed on the combination optical film in which the end faces x of the optical films A are butted against each other. FIG. 13(C) shows an example comprising a combination optical film composed of optical films A whose end faces x are butted against each other, a single optical film A' provided on the combination optical film, and a diffusion layer D provided thereon. Examples of the optical film A' used may include those of the optical film A.

Figure 14:
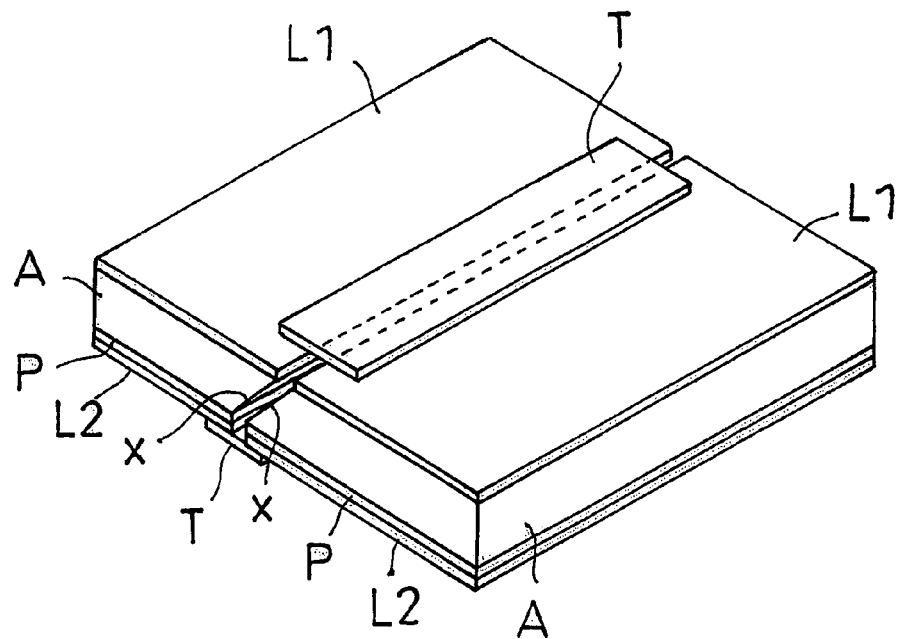
FIG. 14 is a perspective view showing a case where easily peelable protective films are attached to both sides of the combination optical film (1) of the invention, and adhesive tapes are attached thereto.

FIG. 14 shows an example comprising a combination optical film composed of a plurality of optical films, easily peelable protective films are attached to the front and back surfaces of the optical films, and adhesive tapes are attached onto the adjacent protective films correspond to the butted portion of the combination optical film to join the protective films to each other. In FIG. 14, an easily peelable protective film L1 (a laminate of a base film and an easily peelable pressure-sensitive adhesive layer formed thereon) is stacked on the front surface of the optical film A. On the other hand, an easily peelable protective film L2 (separator) for a pressure-sensitive adhesive layer P is stacked on the back surface of the optical film A. The protective film L2 (separator) is peeled off at the adhesive interface with the pressure-sensitive adhesive layer P, while the protective film L1 is generally a laminate of a base film and an easily peelable pressure-sensitive adhesive layer formed thereon so that the base film can be peeled off together with the pressure-sensitive adhesive layer. The end faces x to be butted may be formed into inclined planes in a state where the optical film A and the pressure-sensitive adhesive layer P are stacked. In such a case, the pressure-sensitive adhesive layer-provided optical film that includes the pressure-sensitive adhesive layer P preferably satisfies the relations $t \leq d \times \tan \theta$ and $1° \leq \theta \leq 60°$.

Figure 15:
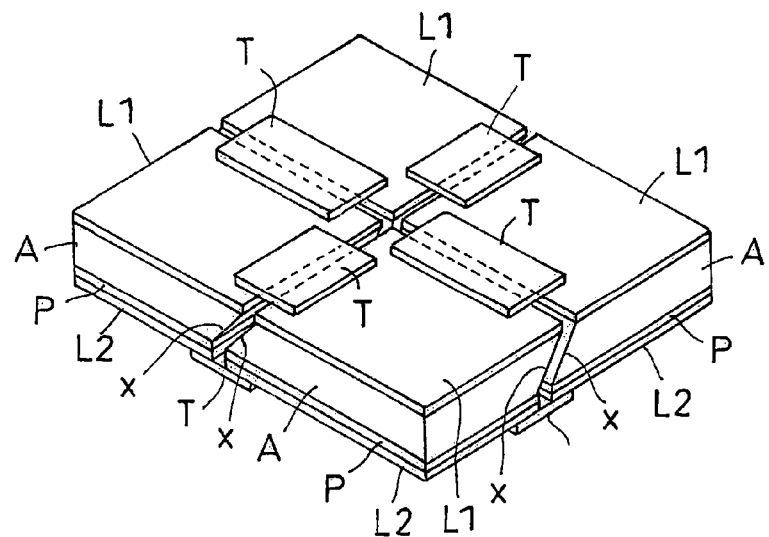
FIG. 15 is a perspective view showing a case where easily peelable protective films are attached to both sides of the combination optical film (1) of the invention, and adhesive tapes are attached thereto.

The protective films L1 or L2 for the optical films A are joined to each other by the adhesive tape T. In FIG. 14, while the protective films L1 and L2 are provided on both sides of the optical film A, only one of them may be provided, or they may be the same on both sides. FIG. 15 shows en example where two optical films A are combined two-dimensionally (four films in total). In FIG. 14 or 15, while the adhesive tape T is provided at a part of the joint between the protective films L1 or L2, it may be provided over the whole of the joint.

While FIG. 14 or 15 illustrates an example using the combination optical film (1) shown in FIG. 1, the same concept may apply to any other type of the combination optical film (1) than that shown in FIG. 1 or apply to the combination optical film (2), (3), (4), (5), or (6).

Figure 16:
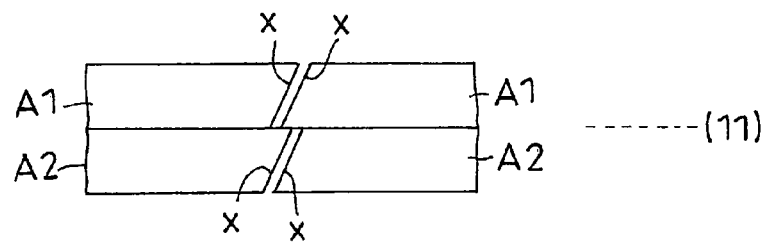
FIG. 16 is a diagram showing an exemplary cross-sectional part of the laminated combination optical film (11) of the invention.

FIG. 16 shows an example of the laminated combination optical film (11) in which at least two pieces of the combination optical films are laminated. While FIG. 16 illustrates a laminate of two pieces of the combination optical films (1) shown in FIG. 1, the same concept may apply to any other type of the combination optical film (1) than that shown in FIG. 1 or apply to the combination optical film (2), (3), (4), (5), or (6). Any of them may also be used in combination.

Figure 17:
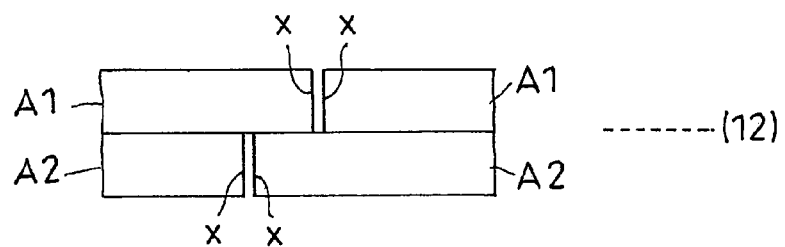
FIG. 17 is a diagram showing an exemplary cross-sectional part of the laminated combination optical film (12) of the invention.

FIG. 17 shows an example of the laminated combination optical film (12) comprising a laminate of a plurality of the combination optical films each comprising a plurality of optical films each having at least one end face butted against one another, wherein the respective combination optical films are stacked in such a manner that the respective butted portions do not coincide with one another in the normal direction of the combination optical films.

In the laminated combination optical film (12) as stated above, a combination optical film of optical films A1 and another combination optical film of optical films A2 are laminated. While the butted end faces x are each vertical to the optical film A1 or A2, the optical films A1 and A2 are arranged in such a manner that the respective butted portions do not coincide with each other.

In FIG. 16 or 17, the same optical films A1 or A2 are generally used to be combined. In each drawing, pair of optical films A1 or A2 shown left and right is preferably the same. On the other hand, the optical films A1 and A2 used may be of different types. For example, the optical film A1 may be a polarizer, while the optical film A2 may be a protective film for the polarizer, so that the laminate can form a polarizing plate. Alternatively, both of the optical films A1 and A2 may be polarizing plates. Alternatively, the optical film A1 may be a polarizing plate, while the optical film A2 may be a retardation plate. The laminate as shown in FIG. 16 or 17 may use an adhesive or a pressure-sensitive adhesive, which is omitted in the drawing. Examples of the optical film A1 and A2 include not only those illustrated above but also optical compensation films, brightness enhancement films, and the like. These aspects may apply to the optical films A1 and A2 shown in any other drawing.

Figure 18:
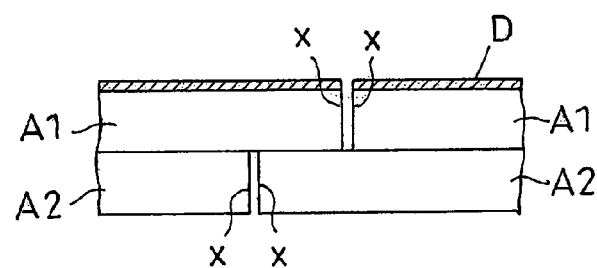
FIG. 18 is a diagram showing an exemplary cross-sectional part of the laminated combination optical film (12) of the invention using the combination optical film (5)
Figure 19A:
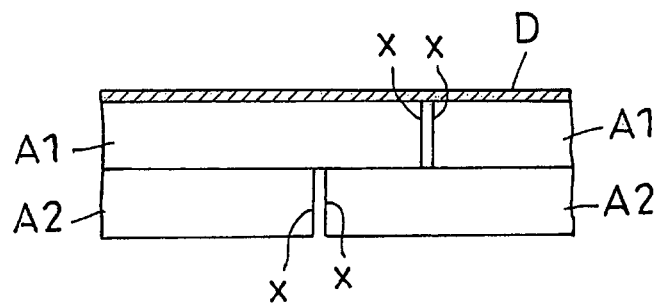
FIG. 19 (A) is a diagram showing an exemplary cross-sectional part of the laminated combination optical film (12) of the invention using the combination optical film (6)
Figure 19B:
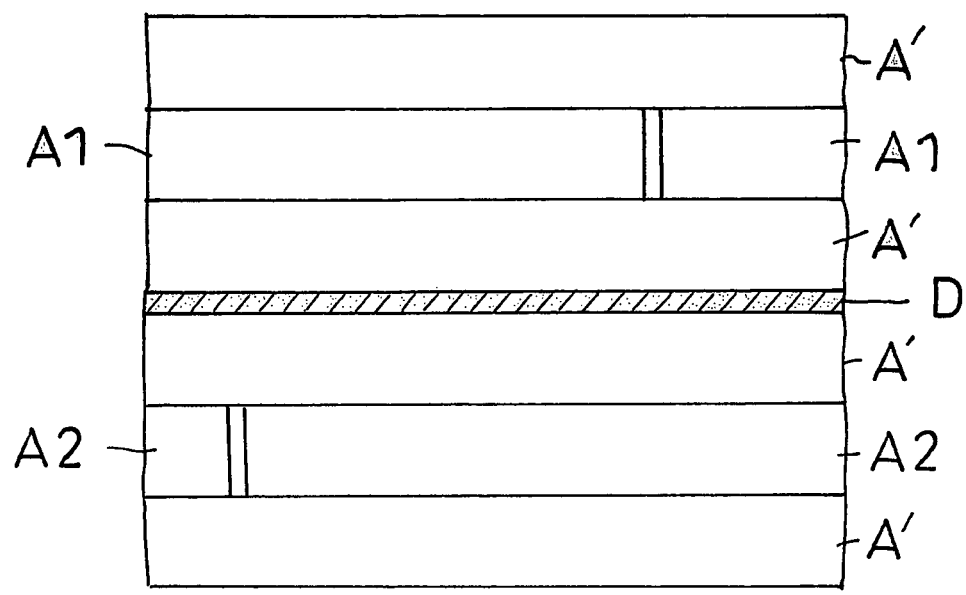

FIG. 18 shows an example of the laminated combination optical film, in which a plurality of optical films A1 that form a front face combination optical film have diffusion layers D at their surfaces. FIG. 19(A) illustrates an example where a diffusion layer D is formed on the surface of a laminated combination optical film. In FIG. 18 or 19(A), while the diffusion layer D is placed on the front surface of the laminated combination optical film shown in FIG. 17, the diffusion layer D may be formed on the back surface or both surfaces. The diffusion layer D may be placed at the interface between a combination optical film of optical films A1 and another combination optical film of optical films A2. Another optical film A' may be used in place of or together with the diffusion layer D. The plurality of optical films A1 or A2 may each include the optical film A', or the optical film A' may be a single film that is formed on the combination optical film in which the end faces x of the optical films A1 or A2 are butted against each other. FIG. 19(B) shows an example where a laminate of a combination optical film of optical films A1 with their end faces x butted against each other and a single optical film A' provided on each of both sides of the combination optical film and another laminate of a combination optical film of optical films A2 with their end faces x butted against each other and a single optical film A' provided on each of both sides of the other combination optical film are stacked with a diffusion layer D placed at the interface therebetween. Examples of the optical film A' used may include those of the optical film A. In FIG. 18, 19(A) or 19(B), the structure of the butted end faces x in each layer may be changed to that of the combination optical film (1), (2), (3), or (4).

Figure 20:
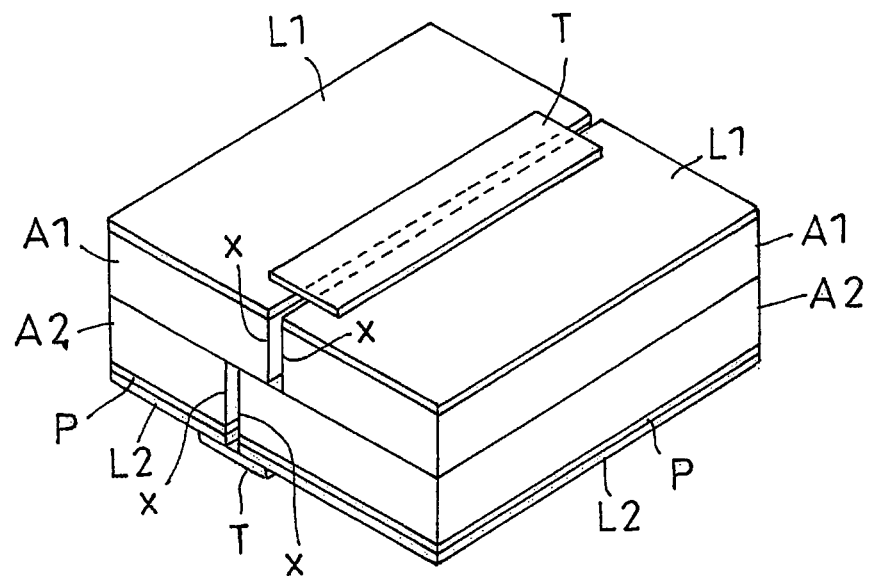
FIG. 20 is a perspective view showing a case where easily peelable protective films are attached to both sides of the laminated combination optical film (12) of the invention, and adhesive tapes are attached thereto.
Figure 21:
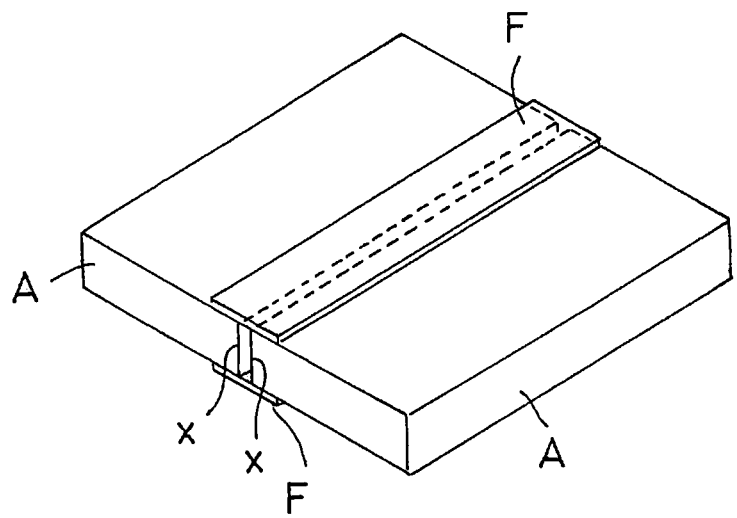
FIG. 21 is a diagram showing an exemplary cross-sectional part of the conventional combination optical film.

FIG. 20 shows an example of the laminated combination optical film comprising front and back combination optical films composed of a plurality of optical films, easily peelable protective films are attached to the plurality of the optical films, and adhesive tapes are attached onto the adjacent protective films correspond to the butted portion of the combination optical film to join the protective films to each other. In FIG. 20, an easily peelable protective film L1 (a laminate of a base film and an easily peelable pressure-sensitive adhesive layer formed thereon) is stacked on the front surface of the optical film A1. On the other hand, an easily peelable protective film L2 (separator) for a pressure-sensitive adhesive layer P is stacked on the back surface of the optical film A2. The protective films L1 or L2 for the optical films A1 or A2 are joined to each other by an adhesive tape T. In FIG. 20, while the protective films L1 and L2 are provided on the optical films A1 and A2, respectively, only one of them may be provided, or they may be the same on both sides. In FIG. 20, while the adhesive tape T is provided at a part of the joint between the protective films L1 or L2, it may be provided over the whole of the joint.

While FIG. 20 illustrates a case using the laminated combination optical film (12), the same concept may apply to any other case.

While FIGS. 16 to 20 each illustrate a case where two pieces of optical films A1 or A2 are used to form a combination optical film, two pieces of optical films A1 or A2 may be combined two-dimensionally (four pieces in total). In this case, the respective combination optical films are arranged in such a manner that the respective butted portions do not coincide with one another. In such an arrangement, the butted portions may coincide at a point, as long as they do not coincide with one another along a line.

A description is given below of the optical film for use in the combination optical films (1), (2), (3), (4), (5), and (6) and the laminated combination optical films (11) and (12).

Any type of optical film for use in forming image displays such as liquid crystal displays may be used without particular limitations. For example, the optical film may be a polarizing plate. In generally, a polarizing plate, which comprises a polarizer and a transparent protective film provided on one or both sides of the polarizer, is used. Alternatively, a polarizer and a transparent protective film may be used as individual optical films.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate or zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the above-mentioned polarizer, with outstanding transparency, mechanical strength, heat stability, moisture cover property, isotropy, etc. may be preferable. For example, polyester type polymers, such as polyethylene terephthalate and polyethylene naphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The transparent protective film can be formed as a cured layer made of heat curing type or ultraviolet ray curing type resins, such as acryl based, urethane based, acryl urethane based, epoxy based, and silicone based.

Moreover, as is described in Japanese Patent Laid-Open Publication No. 2001-343529 (WO 01/37007), polymer films, for example, resin compositions including (A) thermoplastic resins having substituted and/or non-substituted imido group in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 1 to 500 μm, especially 5 to 200 μm in viewpoint of strength, work handling and thin layer.

The protective film is preferably as colorless as possible. Thus, a protective film is preferably used which has an out-of-plane retardation of −90 nm to +75 nm, wherein the retardation (Rth) is represented by the formula: Rth=(nx−nz)d, wherein nx is a refractive index of slow axis direction in the plane of the film, nz is a refractive index in the film-thickness direction, and d is the thickness of the film. If a protective film with such an out-of-plane retardation value (Rth) of −90 nm to +75 nm is used, coloring (optical coloring) of the polarizing plate can be almost avoided, which could otherwise be caused by any other protective film. The out-of-plane retardation (Rth) is more preferably from −80 nm to +60 nm, particularly preferably from −70 nm to +45 nm.

As the transparent protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used.

The above-mentioned polarizer and the protective film are usually adhered with aqueous adhesives or the like. As the aqueous adhesives, isocyanate based adhesives, polyvinyl alcohol based adhesives, gelatin based adhesives, vinyl based latex based, aqueous polyurethane based adhesives, aqueous polyester based adhesives, and etc. may be exemplified.

As the opposite side of the polarizing-adhering surface of the transparent protective film, a film treated with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles (including beads) comprising cross-linked or non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the transparent protective film itself, and also they may be prepared as an optical layer different from the transparent protective film.

Further an optical film of the invention may be used as other optical layers, such as a reflective plate, a transflective plate, a retardation plate (a half wavelength plate and a quarter wavelength plate included), and a viewing angle compensation film, a brightness enhancement film, which may be used for formation of a liquid crystal display etc. These are used in practice as an optical film, or as one layer or two layers or more of optical layers laminated with polarizing plate.

Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated transparent protective film. Moreover, a different type of plate with a fine concavo-convex structure on the surface obtained by mixing fine particle into the transparent protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the transparent protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarizing plate or circularly polarizing plate on which the retardation plate is laminated to the polarizing plates will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without coloring mentioned below by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from 20 to 150 µm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyaryl sulfones, polyamides, polyimides, polyolefins, polyvinyl chlorides, cellulose type polymers, norbornene type resins, bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, are obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates are laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate include a retardation plate, an orientation film of a liquid crystal polymer, or an orientation layer of a liquid crystal polymer supported on a transparent substrate. Ordinary retardation plate is a polymer film having birefringence property that is processed by uniaxially stretching in the plane direction, while the viewing angle compensation retardation plate used is a bidirectional stretched film having birefringence property that is processed by biaxially stretching in the plane direction, or a film, which is controlled the refractive index in the thickness direction, that is processed by uniaxially stretching in the plane direction and is processed by stretching in the thickness direction, and inclined orientation film. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. As raw material polymers of the retardation plate, the same polymers the described above is used. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; a film that has the characteristics of reflecting a circularly polarized light with either left-handed or right-handed rotation and transmitting other light, such as an aligned film of cholesteric liquid-crystal polymer or a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing process ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

A pressure-sensitive adhesive layer for adhering to any other component such as a liquid crystal cell may also be formed on one or both sides of the optical film. Such a pressure-sensitive adhesive layer may also be used for the lamination of optical films, and a separator may be provided on the pressure-sensitive adhesive layer. In FIG. 14, 15 or 20, an easily peelable protective film (separator) L2 is provided for a pressure-sensitive adhesive layer P.

As pressure-sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of the optical film. As an example, about 10 to 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be provided on one side or both sides of a polarizing plate or an optical film as a layer in which pressure-sensitive adhesives with different composition or different kind etc. are laminated together. When provided on both sides, the pressure-sensitive adhesive layers may differ in composition, type, thickness or the like between the front and back sides of the polarizing plate or the optical film. Thickness of a pressure-sensitive adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that are coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In order to protect the optical film itself, an easily peelable protective film may be provided on the optical film. In FIGS. 14, 15 and 20, an easily peelable protective film L1 is provided.

While the protective film may be formed only of a base film, it generally comprises a base film and a pressure-sensitive adhesive layer that is formed on the base film such that it can be peeled together with the base film from the optical film.

In addition, in the present invention, ultraviolet absorbing property may be given to the above-mentioned optical film, and the pressure-sensitive adhesive layer etc., using a method of adding UV absorbents, such as salicylic acid ester type compounds, benzophenol type compounds, benzotriazol type compounds, cyano acrylate type compounds, and nickel complex salt type compounds.

A description is given below of methods for producing the combination optical films (1), (2), (3), (4), (5), and (6), and the laminated combination optical films (11) and (12) according to the invention.

When the combination optical film (1), (2), (3), (4), (5), or (6) according to the invention is produced, the sizes of the optical films to be combined are each adjusted depending on the size of the combination optical film to be produced. Any number of pieces of optical films may be combined. While the combination optical film to be produced may be of any size, a size of 65 inches or more (or 800 mm or more in width and 1350 mm or more in length) is particularly effective for large size products. On the other hand, when small combination optical films are produced, there can be provided the advantage that individual optical films are easy to transport or feed.

When the combination optical film (1) of the invention is produced, the end faces of the optical films to be butted are formed or shaped so as to substantially match one another in shape and so as to have at least a portion non-vertical to the front and back surfaces of the optical films. When the end faces of the optical films are each formed into an inclined plane as shown in FIG. 1, for example, the process may include stacking a plurality of optical films and forming the end faces of the optical films at the desired angle with a cutting machine or the like so that the end faces of the optical films can be finished.

In order to form the combination optical film (1), the shaped end faces of the optical films are butted against one another. In the front or back of the butted portion, the optical films are butted so as not to form a continuous gap in the normal direction of the optical films from the front to back surfaces.

When the combination optical film (2) of the invention is produced, the end faces of the optical films may be butted against one another, and a bonding agent having substantially the same refractive index as the optical films may be placed in the gap (about 0 to about 20 μm) of the butted portion to join them. The bonding agent may be appropriately determined, depending on the type of the optical films. For example, any of various types such as acrylic, epoxy, and polyester bonding agents may be used. While the bonding agent may be any of a peelable pressure-sensitive adhesive and a non-peelable adhesive, the pressure-sensitive adhesive has the advantage that recombination is possible and the components can be made compact when transported or stored.

When the combination optical film (3) of the invention is produced, the end faces of the optical films may be butted against one another, feeding an organic solvent capable of dissolving the optical films into the gap (about 0 to about 20 μm) of the butted portion to dissolve the optical films with the organic solvent, and then drying the solution to a solid so that the butted portions are bonded. The organic solvent may be appropriately determined depending on the type of the optical films. For example, when triacetylcellulose is used for the optical film (a protective film for a polarizer), examples of the organic solvent may include halogen solvents, ester solvents and ketone solvents. In particular, methylene chloride or ethyl acetate has good dissolving properties. When norbornene resins are used for the optical film (a protective film for a polarizer), examples of the organic solvent may include hydrocarbon solvents. In particular, hexane, heptane, octane, or the like is preferred in terms of dissolving properties.

When the combination optical film (4) of the invention is produced, the end faces of the optical films may be butted against one another and the gap (about 0 to about 20 μm) of the butted portion may be joined by heat fusion. The conditions for the heat fusion may be appropriately determined depending on the type of the optical films. For example, triacetylcellulose films may be fused with one another at a temperature of 160° C. or more.

When the combination optical film (5) of the invention is produced, the end faces of the diffusion layer-possessing optical films may be butted against one another. The gap of the butted portion is preferably from about 0 to about 20 μm.

When the combination optical film (6) of the invention is produced, the end faces of the optical films may be butted against one another, and then the diffusion layer may be formed. The gap of the butted portion is preferably from about 0 to about 20 μm.

The laminated combination optical film (11) of the invention may be produced by sequentially forming the respective layers of the combination optical film (1), (2), (3), (4), (5), or (6) or by laminating the independently-prepared combination optical films (1), (2), (3), (4), (5), or (6).

The laminated combination optical film (12) of the invention may also be produced by sequentially forming the respective layers of the combination optical film or by laminating the independently-prepared combination optical films, in such a manner that the butted portions of the combination optical films in the respective layers do not coincide with one another. A spacing of generally 100 mm or more, preferably 200 mm or more is preferably provided between the adjacent butted portions, depending on the size of the optical films.

The method for forming the diffusion layer or the antiglare layer illustrated above may also be used to form the diffusion layer on one or both sides for the combination optical film (5) or (6) or the laminated combination optical film (11) or (12) according to the invention. The diffusion layer may be formed as a pressure-sensitive adhesive diffusion material. For example, the fine particle-dispersed diffusion materials as disclosed in JP-A No. 2000-347006 and JP-A No. 2000-347007 are preferably used. The diffusion layer may have any thickness and preferably can diffuse light leakage from the butted portion without causing defects in the optical properties of the optical films. The diffusion layer preferably has a haze of 0 to 90%, more preferably of 60 to 90%.

When the combination optical film (1), (2), (3), (4), (5), or (6), or the laminated combination optical film (11) or (12) according to the invention is used in the manner as shown in FIG. 14, 15 or 20, any adhesive tape having an adhesive strength that allows joining of the protective films and peeling and removal of them at one time may be used for the attachment onto the protective films without particular limitations.

The combination optical film or the laminated combination optical film of the invention is preferably used to form various types of image displays such as liquid crystal displays. Liquid crystal displays may be formed according to conventional techniques. Specifically, liquid crystal displays are generally formed by appropriately assembling a liquid crystal cell and the combination optical film or the laminated combination optical film and optionally other components such as a lighting system and incorporating a driving circuit according to any conventional technique, except using the combination optical film or the laminated combination optical film of the invention. Any type of liquid crystal cell may also be used such as a TN type, an STN type and a n type.

Suitable liquid crystal displays, such as liquid crystal display with which the combination optical film or the laminated combination optical film has been located at one side or both sides of the liquid crystal cell, and with which a backlight or a reflective plate is used for a lighting system may be manufactured. In this case, the combination optical film or the laminated combination optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. The optical film (including the polarizing plate) of the present is applied to the organic EL display. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and many compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

The invention is more specifically described by showing the examples below, which are not intended to limit the invention.

Example 1

A triacetylcellulose film (40 μm thick on one side, 80 μm thick on both sides) as protective film was bonded to both sides of a polyvinyl alcohol polarizer (25 μm thick) with a polyvinyl alcohol adhesive. The resulting laminate was used as a polarizing plate.

One end face (long side) of the polarizing plate (400 mm long and 300 mm wide) was worked so that the worked end face was inclined by an angle of 15° with respect to the normal direction of the polarizing plate. The worked end faces were butted against each other so that a combination polarizing plate was prepared. The butted portion had a gap of 10 μm, but the polarizing plates were butted against each other so as not to form a continuous gap in the normal direction of the polarizing plate from the front to back surfaces.

Example 2

A combination polarizing plate was prepared in the same manner as in Example 1, except that one end face (long side) of each polarizing plate used was worked so that the worked end face was inclined by an angle of 30° with respect to the normal direction of the polarizing plate.

Example 3

A silicone resin fine particles-containing pressure-sensitive adhesive having a haze value of 80% and a diffusion function was applied to one side of the polarizing plate described in Example 1 to form a diffusion layer (25 μm thick).

One end face (long side) of the diffusion layer-provided polarizing plate was worked from the diffusion layer side so that the worked end face was inclined by an angle of 15° with respect to the normal direction of the polarizing plate. On the other hand, the same type of diffusion layer-provided polarizing plate was worked from the polarizing plate side so that the worked end face substantially matched, in shape, the above end face to be butted and was inclined by an angle of 15° with respect to the normal direction of the polarizing plate. These worked end faces were butted against each other so that a combination polarizing plate was prepared. The butted portion had a gap of 10 μm, but the polarizing plates were butted against each other so as not to form a continuous gap in the normal direction of the polarizing plate from the front to back surfaces.

Example 4

After the polarizing plates prepared in Example 1 were worked in the same manner as in Example 1, the worked end faces were butted against each other. Methylene chloride was applied to the gap of the butted portion with a brush so that the triacetylcellulose was dissolved. The dissolved portion was then dried to be solidified so that they were bonded to each other to form a combination polarizing plate.

Example 5

A silicone resin fine particles-containing pressure-sensitive adhesive having a haze value of 80% and a diffusion function was applied to one side of the polarizing plate described in Example 1 to form a diffusion layer (25 μm thick).

One end face (long side) of the diffusion layer-provided polarizing plate was worked vertical to the polarizing plate. The worked end faces were butted against each other so that a combination polarizing plate was prepared. The butted portion had a gap of 10 μm.

Example 6

One end face (long side) of the polarizing plate prepared in Example 1 was worked vertical to the polarizing plate. The worked end faces were butted against each other. Methylene chloride was applied to the gap of the butted portion with a brush so that the triacetylcellulose was dissolved. The dissolved portion was then dried to be solidified so that they were bonded to each other to form a combination polarizing plate.

Example 7

One end face (long side) of the polarizing plate prepared in Example 1 was worked vertical to the polarizing plate. The worked end faces were butted against each other such that the butted portion had a gap of 10 μm. Thereafter, a cyanoacrylate adhesive (Aron Alpha manufactured by Toagosei Co., Ltd., with a refractive index of 1.52 (the difference between the refractive index of the adhesive and that (1.49) of the polarizing plate (the triacetylcellulose part) was 0.03)) was used and introduced into the gap of the butted portion and then solidified so that the polarizing plates were bonded to form a combination polarizing plate. In this process, the triacetylcellulose was partially dissolved with the cyanoacrylate adhesive, and the dissolved portion was solidified.

Example 8

One end face (long side) of the polarizing plate prepared in Example 1 was worked vertical to the polarizing plate. The worked end faces were butted against each other such that the butted portion had a gap of 10 μm. Separately, butting was performed in the same manner such that the butted portion had a gap of 10 μm. The two resulting combination polarizing plates were laminated in such a manner that the butted portions did not coincide with each other (in which the distance between the butted portions was 100 mm) so that a laminated combination polarizing plate was prepared.

Example 9

A uniaxially-stretched film (with a thickness of 80 μm and a front retardation of 140 nm) of a thermoplastic saturated norbornene resin (Arton manufactured by JSR Corporation) was used as a retardation plate. A 25 μm-thick acrylic pressure-sensitive adhesive layer was formed on one side of the retardation plate so that a pressure-sensitive adhesive layer-provided retardation plate was obtained.

One end face (long side) of the pressure-sensitive adhesive layer-provided retardation plate (400 mm long and 300 mm wide) was worked so that the worked end face was inclined by an angle of 15° with respect to the normal direction of the retardation plate. The worked end faces were butted against each other so that a combination pressure-sensitive adhesive layer-provided retardation plate was prepared. The butted portion had a gap of 10 μm, but the retardation plates were butted against each other so as not to form a continuous gap in the normal direction of the pressure-sensitive adhesive layer-provided retardation plate from the front to back surfaces.

Comparative Example 1

One end face (long side) of the polarizing plate prepared in Example 1 was worked vertical to the polarizing plate. The worked end faces were butted against each other so as to form a gap of 10 μm therebetween so that a combination polarizing plate was prepared.

Comparative Example 2

A combination polarizing plate was prepared in the same manner as in Example 1, except that, in Example 1, the polarizing plates were butted against each other such that the butted portion had a gap of 50 μm.

Comparative Example 3

A combination retardation plate was prepared in the same manner as in Example 1, except that, in Example 9, the pressure-sensitive adhesive layer-provided retardation plates were butted against each other such that the butted portion had a gap of 50 μm.

(Evaluations)

The combination polarizing plates (including the laminated type) and the combination pressure-sensitive adhesive layer-provided retardation plates obtained in Examples and Comparative Examples were evaluated as described below. The results are shown in Table 1.

(Combination Polarizing Plate)

A polarizing plate (NPF-SEG1224DU manufactured by Nitto Denko Corporation) was bonded to one side (viewer side) of a liquid crystal cell (prepared by separating optical films such as polarizing plates and retardation plates from the liquid crystal panel of AQUOS LC-26GD1 manufactured by Sharp Corporation), and the combination polarizing plate was bonded to the other side (backlight side) to form a liquid crystal panel. The polarizing plates on both sides of the liquid crystal cell were arranged in the cross Nicol configuration. The combination polarizing plate side of the liquid crystal panel was placed on a backlight (separated from the above LC-26GD1) so that a liquid crystal display was prepared. In the liquid crystal display, light leakage from the gap (the butted portion) was visually evaluated according to the criteria below when no voltage was applied (black viewing).

(Combination Pressure-Sensitive Adhesive Layer-Provided Retardation Plate)

A polarizing plate (NPF-SEG1224DU manufactured by Nitto Denko Corporation) was bonded to one side (viewer side) of a liquid crystal cell (prepared by separating optical films such as polarizing plates and retardation plates from the liquid crystal panel of AQUOS LC-26GD1 manufactured by Sharp Corporation), and the combination pressure-sensitive adhesive layer-provided retardation plate and the same polarizing plate were bonded to the other side (backlight side) to form a liquid crystal panel. The polarizing plates on both sides of the liquid crystal cell were arranged in the cross Nicol configuration. The absorption axis of the polarizing plate on the backlight side was placed substantially parallel to the slow axis of the combination retardation plate. The combination pressure-sensitive adhesive layer-provided retardation plate side of the liquid crystal panel was placed on a backlight (separated from the above LC-26GD1) so that a liquid crystal display was prepared. In the liquid crystal display, light leakage from the gap (the butted portion) was visually evaluated according to the criteria below when no voltage was applied (black viewing).

(Brightness)

The central brightness A ($cd/cm^2$) of the butted portion and the peripheral brightness B ($cd/cm^2$) were measured with a brightness photometer (CA-1500 manufactured by Konica Minolta Holdings, Inc.). The difference between these values (central brightness A and peripheral brightness B) was calculated. In the polarizing plate of the combination optical film, the central brightness A was measured with respect to the butted portion (line), while the peripheral brightness B was measured with respect to the portion other than the butted portion. In the polarizing plate of the laminated combination optical film, which had a plurality of butted portions, the highest brightness value among the measurements with respect to the plurality of butted portions was defined as the central brightness A, while the peripheral brightness B was measured with respect to the part separate from the butted portions (lines). The same applied to the retardation plate of the combination optical film and to the retardation plate of the laminated combination optical film.

(Criteria for Visual Evaluation)

The sample was visually observed from a position 50 cm distant from the sample, and lines caused by butting and light leakage from the butted portion were evaluated on a three point scale as shown below.

⊙: The butted portion is neither visually recognizable in the normal direction nor in oblique directions;

○: The butted portion is not visually recognizable by observation in the normal direction but visually recognizable in an oblique direction; and x: The butted portion is visually recognizable by observation in the normal direction.

TABLE 1

| | Optical Films | | | Butted Portion | | | |
|---|---|---|---|---|---|---|---|
| | Material | Number of Layers | Thickness d (μm) | End Face Shape | Gap t (μm) | Diffusion Layer | Joint |
| Example 1 | Polarizing Plates | 1 | 130 | Inclination Angle θ (15°) | 10 | — | — |
| Example 2 | Polarizing Plates | 1 | 130 | Inclination Angle θ (30°) | 10 | — | — |
| Example 3 | Polarizing Plates | 1 | 130 | Inclination Angle θ (15°) | 10 | Present | — |
| Example 4 | Polarizing Plates | 1 | 130 | Inclination Angle θ (15°) | — | — | Dissolution |
| Example 5 | Polarizing Plates | 1 | 130 | Vertical | 10 | Present | — |
| Example 6 | Polarizing Plates | 1 | 130 | Vertical | — | — | Dissolution |
| Example 7 | Polarizing Plates | 1 | 130 | Vertical | — | — | Adhesive |
| Example 8 | Polarizing Plates | 2 | 130 × 2 | Vertical | 10 | — | — |
| Example 9 | Retardation Plates | 1 | 105 | Inclination Angle θ (15°) | 10 | — | — |
| Comparative Example 1 | Polarizing Plates | 1 | 130 | Vertical | 10 | — | — |
| Comparative Example 2 | Polarizing Plates | 1 | 130 | Inclination Angle θ (15°) | 50 | — | — |
| Comparative Example 3 | Retardation Plates | 1 | 105 | Inclination Angle θ (15°) | 50 | — | — |

| | Evaluations | | | |
|---|---|---|---|---|
| | Central Brightness A of Butted Portion | Peripheral Brightness B | Difference between A and B (cd/cm$^2$) | Visual Evaluation |
| Example 1 | 0.7 | 0.4 | 0.3 | ○ |
| Example 2 | 0.6 | 0.4 | 0.2 | ○ |
| Example 3 | 0.9 | 0.4 | 0.5 | ◉ |
| Example 4 | 0.7 | 0.4 | 0.3 | ◉ |
| Example 5 | 9 | 0.4 | 8.6 | ○ |
| Example 6 | 12 | 0.4 | 11.6 | ○ |
| Example 7 | 11 | 0.4 | 10.6 | ○ |
| Example 8 | 2 | 0.3 | 1.7 | ○ |
| Example 9 | 8 | 0.4 | 7.6 | ○ |
| Comparative Example 1 | 25 | 0.4 | 24.6 | X |
| Comparative Example 2 | 32 | 0.4 | 31.6 | X |
| Comparative Example 3 | 31 | 0.4 | 30.6 | X |

In Examples, the central brightness A of the butted portion is relatively small, the difference between central brightness A and peripheral brightness B is 20 cd/cm$^2$ or less, and light leakage from the butted portion is prevented. In Comparative Examples, however, the central brightness A of the butted portion is relatively large, the difference between central brightness A and peripheral brightness B is more than 20 cd/cm$^2$, and the butted portion is visually recognizable. The inclination of the butted portion satisfies the relation t≦d×tan θ in the combination polarizing plates of Examples 1 to 4 and the combination pressure-sensitive adhesive layer-provided retardation plate of Example 9. In contrast, the inclination of the butted portion has the relation t>d×tan θ in the combination polarizing plate of Comparative Example 2 and the combination pressure-sensitive adhesive layer-provided retardation plate of Comparative Example 3.

INDUSTRIAL APPLICABILITY

The combination optical film of the invention or the laminated combination optical film of the invention is suitable for use in image displays such as liquid crystal displays, organic electroluminescence displays and plasma display panels.

The invention claimed is:

1. A combination optical film, comprising:
a plurality of optical films, each having a front surface, a back surface, and an end face extending from the front surface to the back surface, the end face of one of the optical films butting against the end face of another one of the optical films, wherein
each of the butted end faces has a length coextensive with a length of the front and back surfaces of each of the respective optical films and a width extending from the front surface to the back surface that is less than a width of the front and back surfaces of each of the respective optical films,
the butted end faces substantially match one another in shape,
the butted end faces each have a portion non-vertical to the front and back surfaces of each of the respective optical films, and
the end faces are butted against one another so as not to form a continuous gap in the normal direction of the optical films from the front to back surfaces.

2. The combination optical film according to claim 1, wherein the butted end faces are planes inclined with respect to the front and back surfaces of the optical films.

3. The combination optical film according to claim 2, wherein the butted end faces make an angle θ of inclination of 1° to 89° with the normal line of the optical films.

4. The combination optical film according to claim 3, wherein the relations t≦d tan θ and 1°≦θ≦60° are satisfied, wherein θ represents the angle of inclination of the butted end faces, t (μm) represents an average distance between the films in the butted portion, and d (μm) represents the thickness of the optical films.

5. The combination optical film according to claim 1, wherein the optical films have a thickness of 500 μm or less.

6. The combination optical film according to claim 1, wherein the optical films are each a polarizer, a protective film for a polarizer, or a polarizing plate comprising a polarizer and a protective film laminated on one or both sides of the polarizer.

7. The combination optical film according to claim 6, wherein the polarizing plates are used as the optical films, and
when a liquid crystal panel is formed which comprises: a liquid crystal cell; the combination polarizing plate placed on the backlight side of the liquid crystal cell; and a polarizing plate (uncombined) placed on the viewer side of the liquid crystal cell in the cross Nicol configuration, the difference between a central brightness A (cd/cm2) of the butted portion of the combination polarizing plate measured in the liquid crystal panel and a brightness B (cd/cm2) of a peripheral portion measured in the liquid crystal panel, which is the difference between the central brightness A and the peripheral brightness B, is 20 cd/cm2 or less.

8. The combination optical film according to claim 1, wherein the optical films are each a retardation plate.

9. The combination optical film according to claim 8, wherein
the retardation plates are used as the optical film, and
when a liquid crystal panel is formed which comprises: a liquid crystal cell; the combination retardation plate placed adjacent to the liquid crystal cell on the backlight side; and polarizing plates (uncombined) placed in the cross Nicol configuration on both sides of the laminate of the liquid crystal cell and the combination retardation plate, wherein an absorption axis of the polarizing plate on the backlight side is placed substantially parallel to a slow axis of the combination retardation plate, the difference between a central brightness A ($cd/cm^2$) of the butted portion of the combination retardation plate measured in the liquid crystal panel and a brightness B ($cd/cm^2$) of a peripheral portion measured in the liquid crystal panel, which is the difference between the central brightness A and the peripheral brightness B, is 20 $cd/cm^2$ or less.

10. The combination optical film according to claim 1, wherein
easily peelable protective films are attached to the front surface and/or back surface of the plurality of optical films, and
an adhesive tape is attached onto the adjacent protective films correspond to the butted portion of the combination optical film to join them to one another.

11. A laminated combination optical film, comprising a laminate of at least two layers of the combination optical films according to claim 1.

12. An image display, comprising the combination optical film according to claim 1.

13. An image display, comprising the laminated combination optical film according to claim 11.

* * * * *